(12) United States Patent
Chiruvolu et al.

(10) Patent No.: US 8,112,817 B2
(45) Date of Patent: Feb. 7, 2012

(54) USER-CENTRIC AUTHENTICATION SYSTEM AND METHOD

(76) Inventors: Girish Chiruvolu, Plano, TX (US); Arpitha Chiruvolu, Plano, TX (US)

( * ) Notice: Subject to any disclaimer, the term of this patent is extended or adjusted under 35 U.S.C. 154(b) by 875 days.

(21) Appl. No.: 11/876,006

(22) Filed: Oct. 22, 2007

(65) Prior Publication Data

US 2009/0037983 A1  Feb. 5, 2009

Related U.S. Application Data

(60) Provisional application No. 60/855,179, filed on Oct. 30, 2006, provisional application No. 60/928,793, filed on May 11, 2007, provisional application No. 60/928,794, filed on May 11, 2007.

(51) Int. Cl.
*G06F 21/00* (2006.01)
(52) U.S. Cl. ............... 726/30; 726/26; 726/27; 726/28; 726/29
(58) Field of Classification Search ............... 726/26–30
See application file for complete search history.

(56) References Cited

U.S. PATENT DOCUMENTS

| 6,209,104 | B1 * | 3/2001 | Jalili ............................. 726/18 |
| 6,871,287 | B1 | 3/2005 | Ellingson |
| 7,093,282 | B2 | 8/2006 | Hillhouse |
| 7,174,462 | B2 | 2/2007 | Peing et al. |
| 7,730,546 | B2 * | 6/2010 | Aoki et al. ....................... 726/28 |
| 2004/0003283 | A1 * | 1/2004 | Goodman et al. ............. 713/201 |
| 2006/0101515 | A1 * | 5/2006 | Amoroso et al. ............... 726/23 |
| 2006/0129835 | A1 * | 6/2006 | Ellmore ........................ 713/183 |
| 2007/0050845 | A1 * | 3/2007 | Das et al. ........................ 726/17 |
| 2007/0192870 | A1 * | 8/2007 | Lynn et al. ..................... 726/26 |
| 2007/0250920 | A1 | 10/2007 | Lindsay |

* cited by examiner

*Primary Examiner* — Vivek Srivastava
*Assistant Examiner* — Anthony Brown
(74) *Attorney, Agent, or Firm* — Michael Diaz

(57) ABSTRACT

A system for authenticating a user in a network. The authentication system includes a computer resource having secure data, an authentication computing system providing dynamic authentication of a user accessing the computer resource, and a user communication device for communicating between the user and the computer resource. The computing system presents a challenge for which a specified response is required based upon a pre-determined function. Access is then granted by the computing system upon providing the correct response to the presented challenge by the user.

26 Claims, 12 Drawing Sheets

USER-CENTRIC AUTHENTICATION SYSTEM AND METHOD

RELATED APPLICATIONS

This utility application claims the benefit of U.S. Provisional Patent Application Ser. No. 60/855,179 by Arpitha Chiruvolu filed Oct. 30, 2006, U.S. Provisional Patent Application Ser. No. 60/928,793 by Girish Chiruvolu filed May 11, 2007, and U.S. Provisional Patent Application Ser. No. 60/928,794 by Girish Chiruvolu filed May 11, 2007, and is hereby incorporated by reference.

BACKGROUND OF THE INVENTION

1. Field of the Invention

This invention relates to authentication systems and methods. Specifically, and not by way of limitation, the present invention relates to a user-centric system and method of authentication.

2. Description of the Related Art

Security and privacy of online data and services are of utmost concern to most consumers utilizing the Internet. There have been many systems and methods employed to provide security and privacy to the Internet user. Authentications systems are often used to authenticate and verify the identity of a user attempting to access online stored data.

One such authentication system involves the use of simple password-based authentication/authorization methodologies. The sensitive data protected by this existing authentication system is clearly at risk if the password is determined or the user leaves his communication device open such that unauthorized persons can access or view the stored data. Saved passwords have often led to unauthorized individuals accessing or modifying stored data. A primary disadvantage of passwords is that they must be memorized. These passwords often have to be changed and many times require the use of special characters (e.g., symbols other than alphanumeric characters) which are hard to keep track of by a user.

In another existing authentication system, biometrics is used, which leverages unique characteristics that are attributed to the user to authenticate the user. Biometrics also has several disadvantages. First, specialized, and often expensive, equipment is required to read the users measured physical characteristics. Second, the measuring by the equipment often results in erroneous readings. Additionally, there are various challenges in order for biometric authentication to be viable and non-intrusive in day to day operations. Biometric authentication systems are also subject to spoofing and false classification of biometric readings.

In another existing authentication system, often in conjunction with a password authentication system, is the use of hard tokens. The hard tokens act as a key to access the sensitive online data. However, the user must keep possession of the hard token, which can easily be lost.

There are no existing authentication systems which dynamically authenticate a user dependent upon the degree of sensitivity of data or access to resources being served or stored via the Internet. Current existing authentication systems merely use a one-time login with occasional screen locks due to inactivity, which requires the re-entry of the password. Even in the case where the user is periodically prompted to change the password, a static password is oftentimes saved in the user environment, which allows another unauthorized person to overcome the password authentication. Moreover, trojans (unauthorized and unnoticed processes that are classified as malware) can steal/collect the history of the passwords and can initiate unauthorized transactions.

Thus, an authentication system and method are needed to overcome the disadvantages of existing authentication systems. An authentication system is need which is non-intrusive, user-friendly, yet provides enhanced security of access to stored online data. The authentication system must allow a user to spend very little time (e.g., a few seconds) to authenticate their identities. Additionally, the system should include a live input fed into a computing system which cannot be replicated by fake one-time inputs.

Accordingly, a user-centric system and method are needed which dynamically authenticates users attempting to access services and/or stored online data. It is an object of the present invention to provide such a method and system.

SUMMARY OF THE INVENTION

In one aspect, the present invention is a system for authenticating a user in a network. The authentication system includes a computer resource having secure data, an authentication computing system providing dynamic authentication of a user accessing the computer resource, and a user communication device for communicating between the user and the computer resource. The computing system presents a challenge for which a specified response is required based upon a set of secret but pre-agreed (or pre-determined) functions. Access is then granted by the computing system upon providing the correct response to the presented challenge by the user. The authentication computing system may utilize a plurality of functions. Each function is associated with a predetermined hint known to the user. The hint provides an indicator of the current function to use when responding to a presented challenge.

In another aspect, the present invention is a method of authentication a user in a network. The method includes the steps of securing data in a computer resource and dynamically authenticating a user accessing the computer resource. The user is presented a challenge for which a specified response is required based upon a pre-determined function. Upon providing the correct response to the presented challenge by the user, access is granted to the computer resource.

In another aspect, the present invention is an authentication computing system for authenticating a user in a network. The authentication computing system dynamically authenticates a user accessing a computer resource and presents a challenge for which a specified response is required based upon a pre-determined function. Access is then granted by the computing system upon providing the correct response to the presented challenge by the user.

In another aspect, the system allows the user to further practice responding to future (dynamic) challenges that may be posed by the authentication system. An expert system fine tunes the profile and ensures non-triviality of the choices made by the user such that the challenges are difficult to be answered by any other person. The customized challenge may aim to achieve a good degree of confusion and information diffusion in the response by the user. The present invention may utilize pre-agreed (computational) functions, hints, and associated data that the user prefers to enter into the profile. The user may repeat the practice sessions as many times as (securely) allowed by the administrator's approval.

DESCRIPTION OF THE INVENTION

Figure 1:
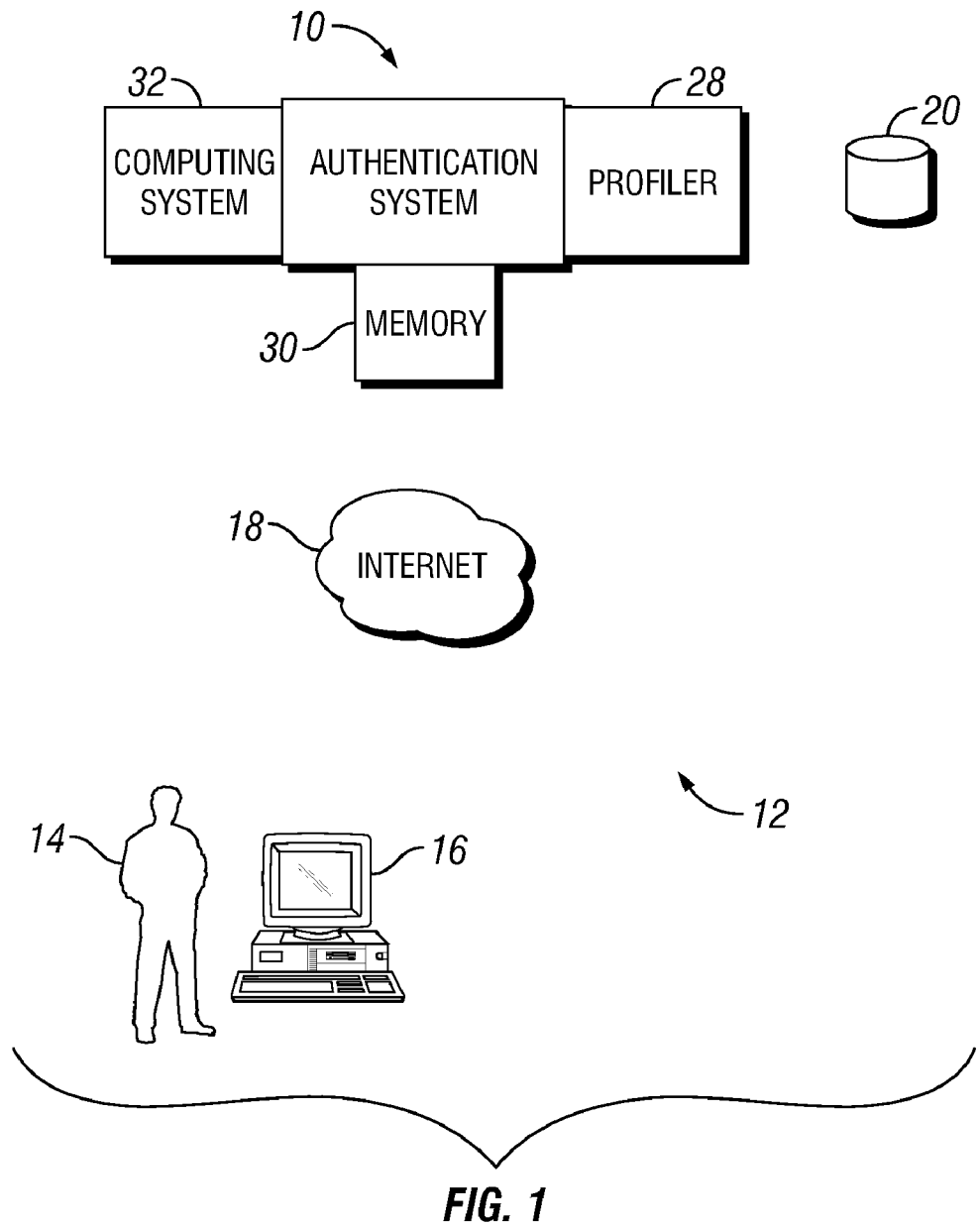
FIG. 1 is a simplified block diagram of the components of an authentication system for use in a network.

The present invention is a user-centric authentication system and method. FIG. 1 is a simplified block diagram of the components of an authentication system 10 for use in a network 12. A user 14 communicates through a user communication device 16 (e.g., computer, mobile phone, personal data assistant (PDA), telephone) via the Internet 18 to a data repository 20. The communication device may be any communication device transferring information over any medium, such as voice, video, etc. The data repository stores sensitive and confidential data accessible via the Internet. The data repository may also provide specialized services to the user. The authentication system 10 includes a memory 30 and a computing system 32. The authentication system authenticates and allows access by authorized individuals to the data repository 20. The data repository may be a service provider or any other computing resource. The authentication system may be located anywhere within the network, such as coupling the authentication system to the communication device 16 or the repository 20 or as a standalone node within the network 12. The authentication system is preferably a server communicating within the network 12. The authentication system may include a profiler 28.

In existing systems, users are initially profiled, authenticated and authorized prior to using or accessing critical data. Profiling the user is the biggest challenge. Current state-of-art systems, at best, utilize semi-static processes which are not flexible in profiling the users. In existing systems, profiling refers to gathering information and data about a particular user (e.g., biological data, habits, and thinking and the user's choices in doing things). The motivation behind such profiling is to capture enough information of the user such that when challenged with certain queries for authentication, only the authorized (authenticated) user is able to correctly respond with the answer. Existing systems usually capture the user's choices in a very inflexible way. The questions are typically centered on capturing answers to a set of preconfigured questions, such as a pet's name, a first car, and a city of birth. In many cases, even though a multi-factor based authentication is used, the choices set by the users for their authentication are so obvious that they are easily broken by friends and acquaintances. In some cases, third party observers can guess the choices easily by following the identity-victim for a sufficient period of time. For example, the first car of the end-user (being profiled for authentication) can be easily guessed. Based on the social and economic status, and the few choices in the automobile market, the "first car" can be guessed.

A second aspect of existing authentication systems' profiling is the lack of tiered rating-based challenge (authentication). Different applications (processes) have different needs of authentication levels. Currently, there exists no mechanism to properly classify elements (choices) of a user's profile. On the contrary, several rating mechanisms have been proposed to find out the degree of confidence in the authentication level of the end-user. However, it never has been a choice of the user to choose the authentication level, thereby leading to limited access of resources that the user is entitled to for that authentication level. For example, when the user is in a public place, the choices (elements of the profile used) for authentication should appropriately take into account an "over-the-shoulder" response protection. If the end-user is challenged with "what's your first car", the end-user is forced to respond with a "static/fixed" response of say, "Toyota". This can be easily observed by the neighbors in the public places. What is needed is a "dynamic/non-static" challenge-response by both authentication server and the end-user, so that even if observed, a one-time response is hard to guess (or how the end-user arrived at the response)

Initially, in the present invention, the authentication system 10 must obtain information from the user 14. In this first initial "profiling" phase, a number of easy-to-remember personally identifiable bits of information of the potential user 14 may be collected as a part of a questionnaire provided to the user 14. This may be conducted either on-site or off-site (via the Internet with secured connection) through a series of menus and questions. This initial step may be repeated as many times as necessary in order to reduce errors and memory lapses on the part of the user. In the preferred embodiment of the present invention, the user periodically reviews the inputted information and provides the authentication system 10 with newer items to be presented during the challenge phase which will be discussed below. A primary goal of this initial step is to collect enough info of the user's choice that may as well serve as entertainment and may help in incidences and severity of Alzheimer's (memory lapses). Furthermore, the user is trained to respond dynamically to the customized challenges generated by the authentication system. This phase may also be used in combination with other authentication systems, such as biometrics (e.g., fingerprints, voice, iris profile, DNA, etc.) The usage of such biometrics depends on the availability of such verifying devices (inputs) at the client (user) side. In this phase, multimedia is preferably included. For example, one could have their pet's pictures or a close friend that is recognizable immediately by the client when presented in a group of choices. Preferably, it is the end-user's choice on what the user is comfortable with in this "quick memory jogging" portion of profiling, as long as the choices are personal and reasonably hard to guess by others.

Figure 2:
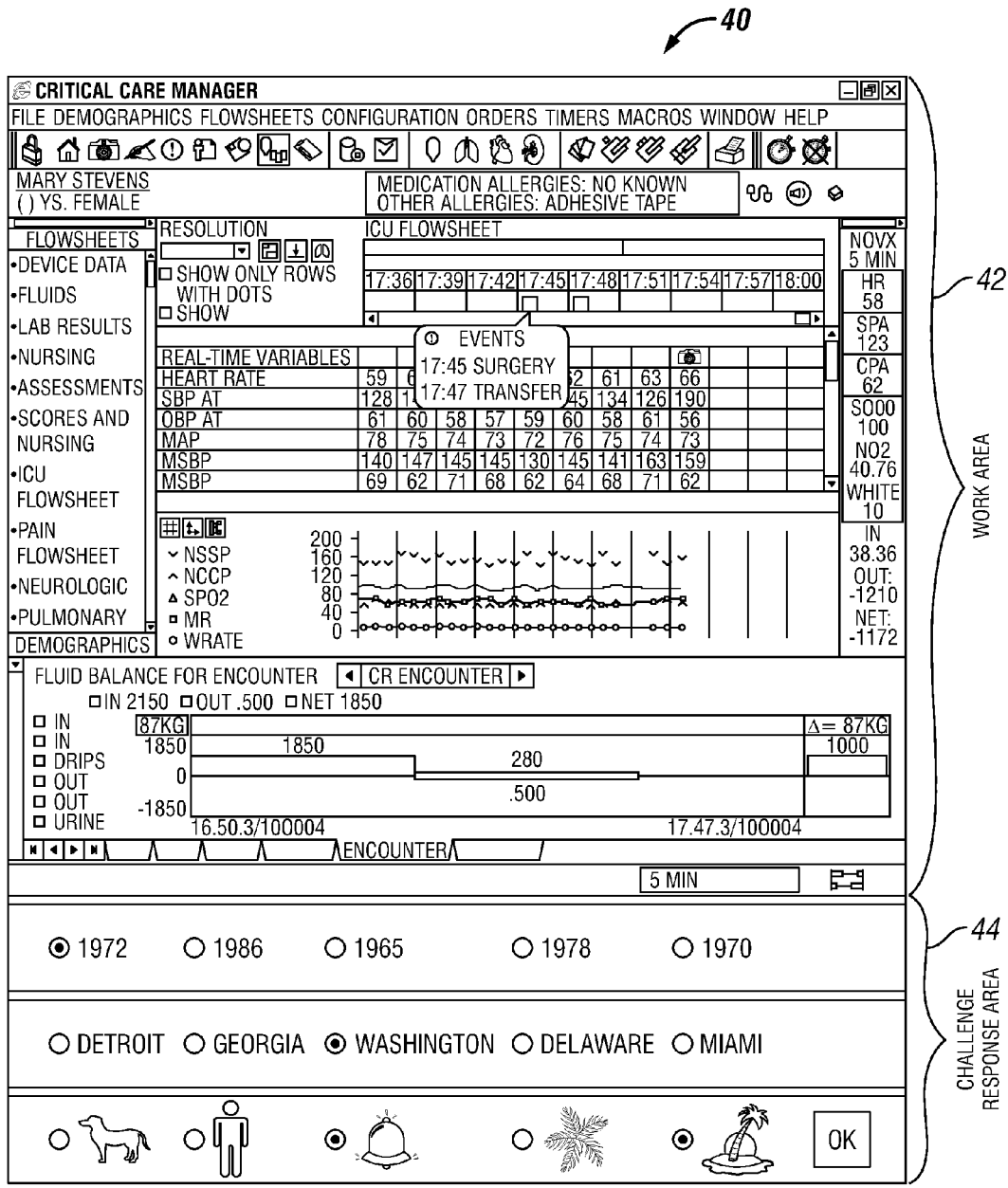
FIG. 2 provides an exemplary screen shot illustrating the quick memory jogging phase.

FIG. 2 provides an exemplary screen shot 40 illustrating the quick memory jogging phase of the present invention. The screen shot illustrates a work area 42 and a challenge and response area 44. Although the challenge and response area is depicted on one screen, the challenge and response area may be displayed in any manner which provides for the display and response input by the user. The challenge and response area may be on multiple screens and without a working area.

Figure 3:
FIG. 3 is a screen shot illustrating a challenge and response dry run for the user during the profiling phase.

FIG. 3 is a screen shot 46 illustrating a challenge and response dry run scenario for the user during the profiling phase. As illustrated, the user must choose from several variables. The difficulty of each question is rated by the user. The user is driven to choose a set of queries that the user is comfortable with and also driven by the authentication system to choose secure queries. In the top half of the screen shot 46, the authentication system recommends query choices to the user. The use may then choose the queries that the user may easily respond. These choices are the answers to the selected queries for real authentication later. The bottom portion of the screen shot 46 depicts a dry-run of the selected queries and answers during a profiling exercise.

The collected information may be presented to the user as a stand-alone application in order to cross check if the user is able to respond quickly without much thinking and memory jogging. Any "gray area" questions may then be improved with appropriate fine-tuning. For example, if the user is presented with a year-of-birth along with other choices, then the user should be able to immediately check that choice as illustrated in FIG. 2, (e.g., 1972). The gray area choices can then be improved by adding more contexts, or more content. At this phase, the user has been fully profiled with all the easy to input (but very specific personal) choices.

Preferably, as the choice rows increase, the probability of picking the right choices by any other unauthorized person decreases exponentially. For example, take the simple case of five choices present in each row (set). The probability of picking a right choice would be 1/5. As the number of sets is increased to 3, the probability of guessing the right combination goes down to (1/5)^3 or 1 in 125. In this case, a good indicator that an unauthorized person is accessing the device is given by the majority of wrong choices, for example 2 out of three choices are incorrectly selected would provide a good indicator of unauthorized access. In addition, multiple choices on one row may also be a part of the methodology. This shall further ensure that potential unauthorized personnel would even have to guess on the number of choices on a row in addition to the actual choices (see 3$^{rd}$ row in FIG. 2). In the situation of non-multiple choice-based challenges, the user input may be in any form (key strokes, finger print, voice etc.). One may easily eliminate the case of machine response through challenge questions based on image pattern recognition that only humans can see and interpret. Choices may then be repeated in a prudent manner.

Further, the choices are preferably classified into "Master-Choices/Queries" and "Cruise-Choices/Queries." The difficulty of Master-Choices may be much more substantial than Cruise-Choices. Master-Choices are preferably invoked for challenge-response whenever the authentication process is boot-strapping or whenever the confidence level (rating) of prior responses to the challenges falls below a certain threshold. Once the user 14 has been authenticated to a degree of confidence, then the user 14 may invoke cruise level. Cruise level may have a decreased number of challenges (set) or degree of difficulty as chosen by the user during the initial phase (profiling). While in Cruise-mode, the user is monitored for continuous activity. If there is inactivity on the user, the Master-Choice level immediately is implemented by the authentication system 10 based on a preset timer and an observed decrease in confidence level during Cruise-mode.

Some of the choices may be retired on a periodic basis depending on the ease and the user's preferences. These retired Master-Choice Questions may be replaced by a user's new Master-Choice Questions that are self-formulated during a periodic re-profiling. In the preferred embodiment of the present invention, some of the Master-Choice Questions are retired on a periodic basis and replaced by new Master-Choice Questions that are self-formulated during a periodic re-profiling. Thus, the present invention provides a multi-level authentication scheme with non-intrusive authentication choices. Depending on the rating (confidence level), the level of authentication actually influences the access control of the sensitive data.

An important aspect of retiring such queries is that of an unauthorized hacker who would simply like to learn about the hints and queries (profile) of a victim user. The goal of such a hacker is simply to invoke the authentication queries and learn about them. A possible way is to not simply respond to the authentication challenge and simply timeout for the next authentication query. This leads to at least a partial revelation of some of the aspects of the profile of the potential victim user. In such cases, there are several methods that can be applied to avoid authentication simply by throwing challenges and not getting any responses. For example, whenever a challenge is either unanswered or wrongly answered, its weight (any function such as auto-regressive) to retire increases and will then be on a "fast track" for retirement (from the user profile). A rating engine that determines the current confidence in the user's authentication level may then give appropriate recommendations to the authentication system 10. The user 14 may be prompted for choosing and going through another partial profiling exercise. In addition to the above, the authentication system 10 may go into a "honey pot" mode, where challenges that have no relationship with the user (potential victim) may be presented to the hacker (unauthorized person who happened to receive challenges) and finally shut out of access with an alarm to an administrator and user about the possible hack-in and need for further investigation. Thus, the hacker is made to believe that he is learning and getting through authentication queries, even though the challenges are fake and serve only one purpose, specifically to keep the hacker sufficiently engaged until proper tracks are identified to capture the hacker (crime prevention).

In this context, the user, during the profiling, may be asked to memorize a few questions that the user should not answer when challenged with any other combination. This leads to a "honey pot" mode where an unsuspecting hacker takes a guess and answers such queries, which is clearly an indication of an unauthorized attempt at hacking. For example, the user (authorized user) should never answer a query on a car choice. Thus when challenged, the authentic user responds back with no choice selected. An unsuspecting hacker would, with great probability, answer by choosing one of the choices, such as "Lexus", "Toyota" or a "BMW". In such cases, the system engages the hacker with fake queries before finally locking out or alerting the administrator.

As such, this scheme is actually a multi-level authentication scheme with non-intrusive authentication choices. Depending on the rating (confidence level), the level of authentication actually influences the access control of the sensitive data.

Multi-level secure databases have been designed mainly for group-based access controls. In many existing schemes, a person or process with lower access-level cannot update a database that is rated to have higher access-level threshold. However, the access control levels are static, i.e., configured only once by the administrator. The main assumption behind such existing schemes is that, the person who logs on to the system with the person's credentials shall remain behind the terminal until all the transactions are completed and the user logs off successfully. However, this assumption is becoming unsafe with various forms of mobility across end computing devices. In addition, the static computing devices (e.g., desktop computers) may be left unattended. This is where the present invention guards against such unintended usage by the unauthorized personnel.

In order to avoid "over-the-shoulder attacks," a few choices may be time dependent. In the preferred embodiment of the present invention, the Master-Choice Questions are dependent on the time, week, day, so that anyone snooping over the shoulder to see the pattern of choices being selected by the legitimate user cannot get a complete comprehension of the user profile unless the snooper watches the legitimate user continuously over a period of time.

As discussed above, although secured hard tokens have been popular, a disadvantage is that the user 14 must remember the personal identification number (PIN) and also possess the hard token. Oftentimes, the token is either lost or stolen or the user must keep possession of the token at all times, which may be inconvenient. This problem can be alleviated by the authentication system having complete control over such one-time random numerical passwords.

In the present invention, a wide range of simple mathematical functions that the user easily understands is utilized. Preferably, the user is exposed to only a few such recommended functions. However, the authentication system 10 may act as an expert system in order to avoid the user choosing trivial and easily breakable one-time password generation, again based on the user's preference and randomly generated challenges as per the mathematical functions chosen.

In addition, in the present invention, the user 14 interprets the challenge presented in the form of a digitized image such that only humans can read and interpret. Depending on the mathematical function chosen, the user responds back to the authentication system based on the pre-chosen (profiled) math function and the digitized (but interpretable by a human) image. The user 14 may choose a specific mathematical function. For example, an image is present in a challenge by the authentication system to the user which contains "2571". The specified function may provide: "From left to right, increment and decrement alternatively the odd positioned integers, treating the left most as odd, the next one even, and the next even positioned and so on." Thus, the correct expected response from the user is "3561". The goal is to treat the user's brain as the computing machine and the pre-chosen math functions (algorithm) are quickly and easily computed.

In another example, "if the digits are in green, respond back with first two and last three digits." If present with "123456789" in green, then the correct response would be 12789.

In the preferred embodiment of the present invention, the user chooses the functions that are readily understood and reproduced. The authentication system preferably has an array of such simple but yet effective mathematical functions that are not only confined to digits but also to letter or other characters. Based on the pre-chosen functions, the authentication system may appropriately combine such challenges with any other queries and combinations that may include coloring, visual and audio aids. This enhances the difficulty of answering by any strangers who might want to guess the functions. The randomization of such queries is again provided by the authentication system, but the algorithms to compute are preferably chosen by the user during profiling. This helps to minimize "over-the-shoulder" password hacking. The algorithms may also take time into consideration. For example in the morning, the end-user may chose to append a "20" to the final answer and while in the afternoon the user may choose to add 30 at the end of the final answer. In the above examples, on the challenge "123456789", the correct response would then be "1278920" while answering in the morning, and while answering in the afternoon, the correct response would be "1278930". Thus, the choice of such combinations will depend on the user's choice and pro-filed and recorded at the authentication server.

In another example, a simple query may be dynamic and effective, such as, Query "2+2=?", and the answer would be based on: "Add the numbers and append last two digits of social security number." If the last two digits of the end-user's social security number are 49, then the answer to "2+2=" would be "449". (2+2 digital addition equals 4 and appending 49 to 4 gives 449). This approach of pre-decided function-based authentication may be very effective for the user on mobile-computers.

The user may be given "pre-decided" hints on such functions. These hints may be pre-decided during profiling, such as color-coded queries or additional images, etc. to provide ease in remembering by the user as well as providing the user a hint at which function to use.

Figure 4:
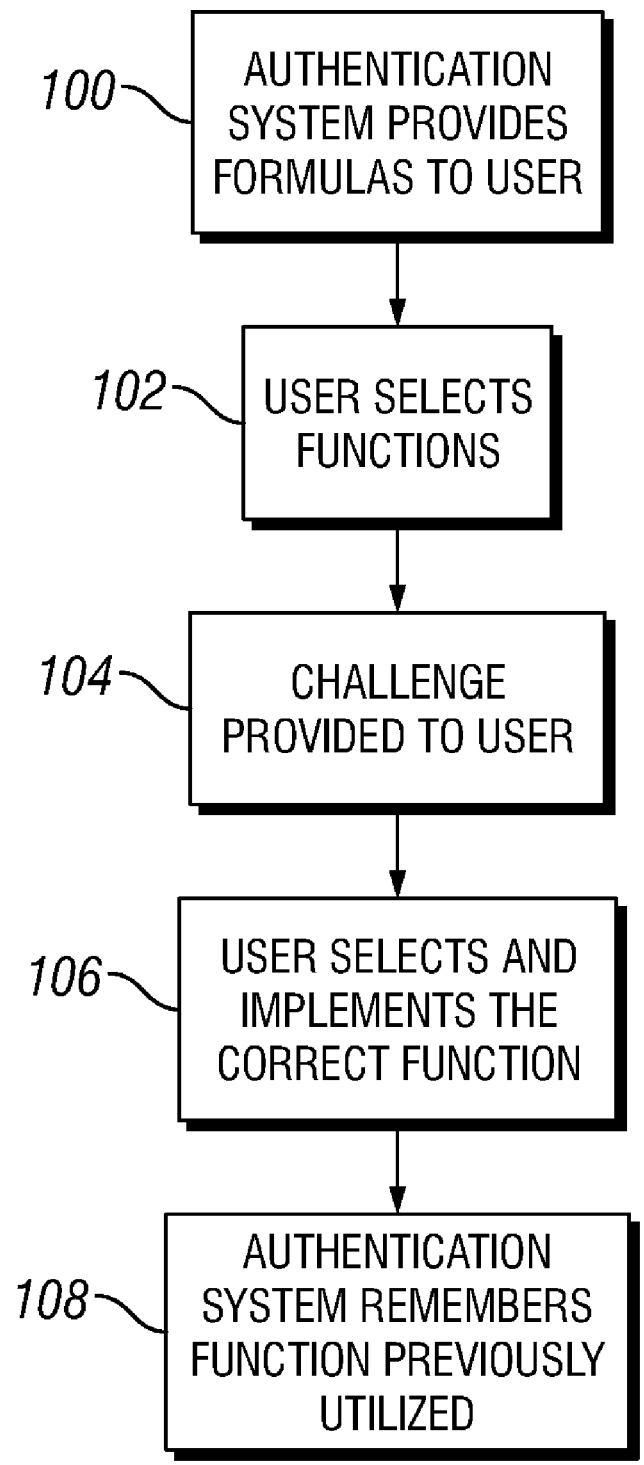
FIG. 4 is a flow chart illustrating the steps of performing a dynamic challenge and response according to the teachings of the present invention.

FIG. 4 is a flow chart illustrating the steps of performing a dynamic challenge and response according to the teachings of the present invention. In step 100, the authentication system 10 presents pre-formulated f1( ), f2( ), . . . fn( ) whose description is readily understood by the user 14 with examples, during profiling. Next, in step 102, the user chooses the functions (from the set of f1( ) . . . fn( )) and remembers when to apply the functions based on pre-decided hints and conditions in which to apply a function for given inputs (as challenged). Thus, each user shall have a set of chosen functions and associated hints. These functions and hints may also be applied in a nested manner. In step 104, the authentication system, during the "challenge" phase of authentication, may generate an alpha-numeric character or characters or any multimedia combination in the form of an image (so that humans can recognize easily but not so easily understood by a communication device). Next, in step 106, the user decides which function to apply and generates an output mentally and finally responds to the challenge. In step 108, the authentication system remembers the selected function and minimizes the repetitive challenge for the user during future authentications.

In the third phase, the data is tagged and stored in a secure location (e.g., memory 30 of the authentication system 10). Preferably, this data is input to a randomizer and encrypted. The authentication system 10 has access to such profile database. The user communication device 16 is preferably hardened by enforcing Internet-based security scheme such as IPSec-based VPN. This implies that proper digital certificates have been installed initially before the user can gain access to the critical data. The first time the user logs into the system through proper authentication with password plug-in, the system goes into a verified-state. However, the critical data is not provided until the user correctly chooses the choices as a response to the choices presented in the challenge area.

In order to speed up the authentication and the verification of inputs from the user 14 at the communication device 16, a client-side process is preferably invoked. This process may be pre-installed client software that acts as an interface between the user 14 and the authentication system 10. It may also be dynamically downloaded from a secure site after the initial security layout (invocation), such as VPN login and client identity verification. The process (software module) that runs on the client (user) side may receive a set of choices from the authentication system in a secure and encrypted form of the user's profile. The software may also harden itself such that it secures the storage on the random access memory (ram) that is unreadable by any other process except itself. The choices are again in an encrypted form such that they are dynamically decrypted on-the-fly before presenting the choices to the user. The client-side process may also contact the authentication system for additional challenges (choices) if necessary to increase the choice's space. The client-side process may also randomize the questions/choices when presenting them in the challenge and response area. If any suspicious activity is detected on the access (violation), depending on the violation, the client-side process may issue a warning before it completely destroys the data on the storage. The client-side process may further shut down the operations and issue an alarm notification to the authentication system. After receiving the alarm notification at the authentication system, the human administrator of the authentication system may intervene and take precautions such as to exclude the communication device 18 from the access list. This ensures that proper investigation is conducted to explore the issue further on an unauthorized intrusion. However, if sufficient bandwidth is available, then the client may be set to receive and authenticate as frequently as desired depending on the trade-off of flexibility and efficiency.

During the initial login of the user when using a secured VPN, the user may be challenged with profiled questions/choices randomly to ensure that the authorized person is indeed located at the accessing computer device 16. This may eliminate or make it more difficult for the use of machine-generated responses by a hacker. In this case, compromise on security arising out of one-time password by a hacker is mitigated and any machine generated automatic responses would fail to match, thereby triggering an alarm. The probability of automated break-ins into the system is extremely low and may be further reduced by posing additional sets of choices at the initial login.

The present invention preferably identifies who has been responsible for any break-in based on the profile choices. By an authorized person correctly following the security protocols, the chances of a major break-in into the secured critical data are extremely low.

As the critical data is accessed and updated, the user 14 may be challenged at various intervals (not necessarily on a periodic basis). One example is when a doctor accesses an Electronic medical record (EMR). A challenge may be presented on a record access level or a group of similar procedures level (i.e., the challenge choices may be presented at various aggregation levels). In another example, various departments of an enterprise may have secret group logos and choices such that during the authentication phase, only the group members may access data of the relevant division. This minimizes cross-divisional unauthorized access. Similarly, the same concept may be employed across multiple enterprises.

The system can be further refined by introducing "soft" thresholds so that there is a level error tolerance when accessing semi-critical data. This embodiment is utilized when critical data is structured on various priority levels. Accordingly, the critical data that was timed out may be made obscure from the viewers. This may also be done manually from a select button on the screen by the user. In addition, timeouts may be utilized for the user to continue further accessing the data when answering the challenge and response queries.

The client-side process (preferably incorporated in a software module) may locally verify the choices before continuing to retrieve the data on the server-side (side of the authentication system 10). The client-side module may present a signature to the server on-behalf of the user in order to convey that this is a legitimate transaction. The authentication system and the client-side module may periodically exchange keys if the current session is sufficiently long enough to allow a change of the encryption keys. Once the client completes accessing the data or any of intrusion/violation conditions occur, the client-side module may destroy itself and move to a "ground zero/null" phase. The zero/null state refers to the state of an end-device that has not been secured and the client-process not installed. As the client-process gets authenticated along with the user, the state moves to a non-zero state and further states are quantified (rated) by the authentication level.

With appropriate open application program interfaces (APIs), the present invention may be integrated into any system and useful in mitigating unauthorized access to sensitive data on an end-user level. Referring back to FIG. 3, FIG. 3 depicts the process graphically. Although the present invention preferably utilizes the Internet with secure access by IPSec/TLS/VPN, the present invention may be adapted to a single entity implementation. For example, all the components of the present invention may be implemented in the operating system of a single computer. In this case, the person who owns the device (e.g., laptop, PDA, handheld computer, workstation, etc.) may go through a profiling exercise and secure certain critical data that the user stores on the computer. In this case, the client process (which may be embedded in the operating system) may be the interface to the stored data and the human behind the monitor. This may serve as a protection to one time password-cracking and break-in to critical data.

In the embodiment depicted in FIG. 1 (Internet version), proper security mechanisms are preferably utilized, such as encryption keys and establishment of secured tunnels (VPNs). In this case, the data (payload) may be encrypted over the Internet and is flexible to any of the encryption standards. As there would be requirements on any back-end system to process automatically and manipulate some of the critical data, the traffic/requests onto the critical data server may be distinguished as human end-consumer vs. machine/process consumer requests. In one embodiment, different logical IP ports may be used. The unattended processes communication device may be first authenticated through an administrator and then automate the process on the allocated ports.

The personal profile obtained in the initial phase may be used to augment any external system (other than one's own enterprise) to universally recognize the user. In this case, other static inputs such as driver's license, (e.g., photo id), could be use in conjunction with the present invention.

Figure 5:
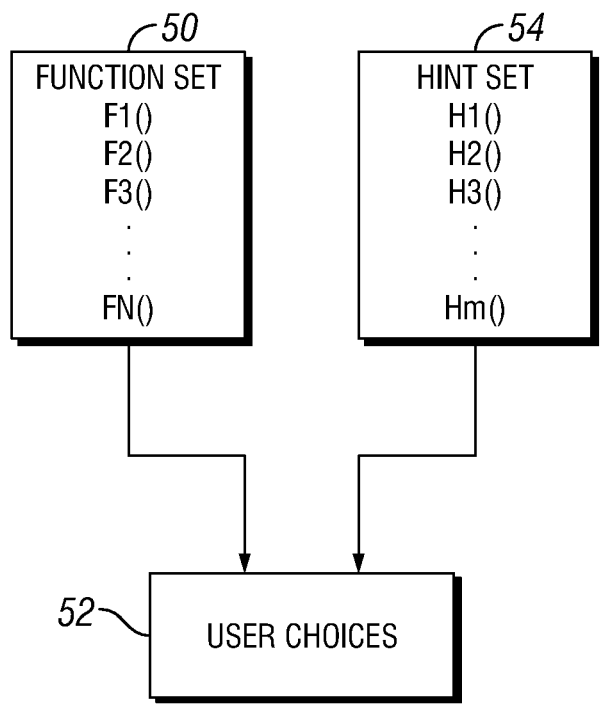
FIG. 5 is a block diagram illustrating an authentication scenario in the preferred embodiment of the present invention.

FIG. 5 is a block diagram illustrating an authentication scenario in the preferred embodiment of the present invention. A function set 50 having a plurality of functions is provided for a user's choices 52. Additionally, a hint set 54 is provided for the user's choices 52. Certain combinations of hints (such as color-coding, special images, etc.) and the appropriate function is invoked and computed on the challenge based on the associated pre-chosen function that corresponds to the hint and presented to the user. The user then provides the correct response. The functions may be of many types, based on certain primitives such as increments/decrements, positional-based (odd, even etc., simple arithmetic and logical functions, and any computing puzzles. Preferably, a small but sufficient set of tuples (fx( ), Hy( )) is utilized, where fx( ) is the function and Hy( ) is the corresponding hint that an user chooses (associates), to make it easy for the authorized user to easily provide the correct responses and at the same time making it difficult for a hacker sneaking or "over-the-shoulder" observations. There are several advantages to utilizing this scheme. First, only the real user can recollect and compute the response to the challenge. Second, the input challenges are dynamic. Thus, a one-time "over-the-shoulder" sneak preview of the challenge and response by the surrounding neighbors is completely avoided. Even if another person sees and records the responses, it is still very difficult to guess which function or algorithm is used and further, since the user (potential victim) is not always challenged with the same function and hint, it is truly dynamic and makes it difficult to defeat the authentication process.

Figure 6:
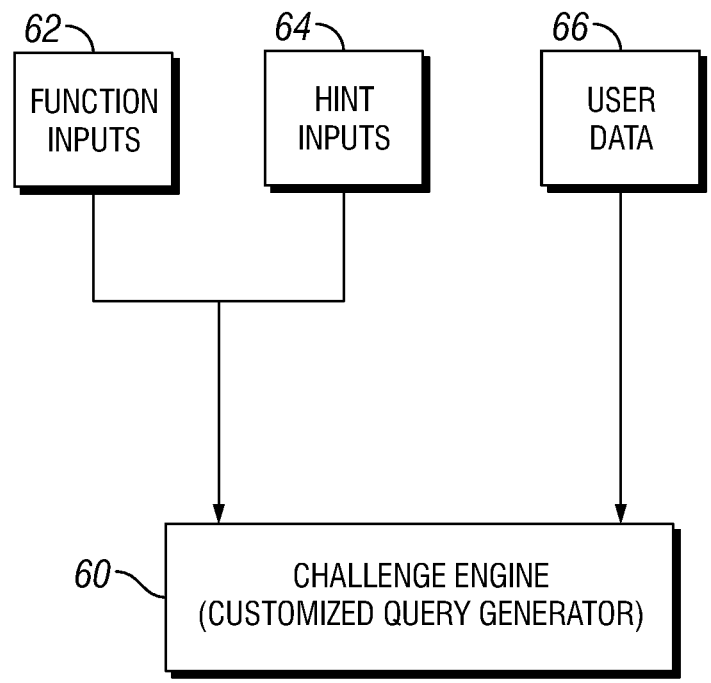
FIG. 6 is a schematic illustrating the basic inputs for a challenge engine used in the authentication system.

FIG. 6 is a schematic illustrating the basic inputs for a challenge engine 60 used in the authentication system 10. The challenge engine provides a customized query-generator. Inputs include function (algorithms) inputs 62 providing pre-agreed computation or responses. These responses may include arithmetic, logical, sequencing which are nested or non-nested algorithms. Additionally, hint inputs 64 provide pre-agreed upon hints by the user and the profiler 28. In addition, user data 66 may include date of birth, partial social security number, name, event or any other bit of information that the user prefers, including multimedia items. From these inputs, the challenge engine constructs a set of queries based upon these inputs.

Figure 7:
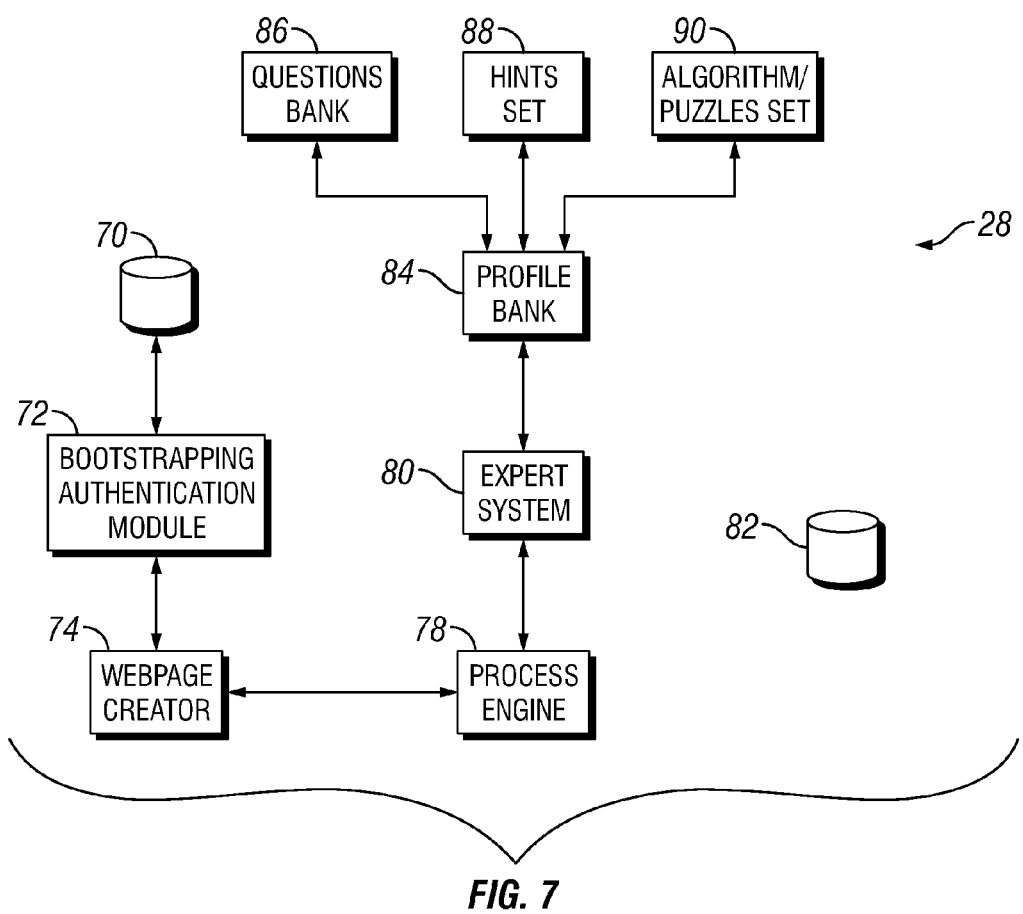
FIG. 7 is a simplified block diagram of internal components of an expert-system driven profiler utilized in the authentication system.

FIG. 7 is a simplified block diagram of internal components of an expert-system driven profiler 28 utilized in the authentication system 10. An initial access token/key database 70 is provided to an initial bootstrapping authentication module 72 to get the user's profile. The administrator may pass on a predetermined URL (through an interface webpage creator 74) to logon and also key-in a one-time password (it expires after a certain period or one usage) securely (preferably via telephone or in person). The user then may log onto the initial webpage and invoke a process engine 78 for profiling.

The URL sent out by an administrator to the user to initiate and boot-strap the profiling of the user may include characteristics such as duration for which the URL is useable (typically a day) and one time usage. The URL may contain a random but non-obvious (secret) valid code that may be extracted by the profiler system and verified for validity. This ensures that hackers are not able to repeatedly attempt to initiate profiling in order to learn about the authentication system. Additionally, it also helps checking repeated requests and may mitigate denial-of-service by the hackers. It may be necessary for the user to be passed a one-time token with the URL to correctly pre-authenticate before getting initiated for the profiling.

The process engine 78 may then invoke an expert system 80 that intelligently profiles the user, through a series of steps (web pages with questionnaires) and finally leads the user to choose a set of hints, and computing functions that the user is comfortable with. In one embodiment, a provision is also made to have dry-runs or practice sessions during the process. After satisfactory profiling, the user's preferences are stored in a profiled database 82. The expert system 80 provides information from the profiled database to a profile bank 84. The profile bank receives inputs from a standard set of questions bank 86, a hints set 88 and an algorithms/puzzle set 90.

The authenticating system 10 thus utilizes the profiler 28 to challenge and also verify the responses.

The system allows the user to further practice on how to respond to the future challenges that may be generated and posed by the authentication system. Furthermore, the expert system, while profiling the user, ensures the "non-triviality" and "non-obviousness" of the end-user's choices of hints, pre-agreed computation and the profiled data. Non-triviality refers to the choices of computation that goes into, when the user comes up with a correct response. The expert system guides (and enforces) the user to choose non-trivial computation function such that a fair degree of "confusion" and "diffusion" are introduced in the response to the challenge(s). Confusion aims at incorporating, in the response, the information contained in the challenge but in an altered manner. The challenge itself may include hints and any text (alpha-numeric) and other possible question-formats. Diffusion in the response aims at moving (permuting) objects (such as characters in the text).

When the user needs to be challenged, the challenge engine 60 may generate a random question which may include any combination of hints and a parameter to operate upon. This parameter may be any combination of alpha-numeric characters or multimedia data. The user may provide an answer based on the hints and the pre-decided computation on the parameter provided by the challenge engine.

Figure 8:
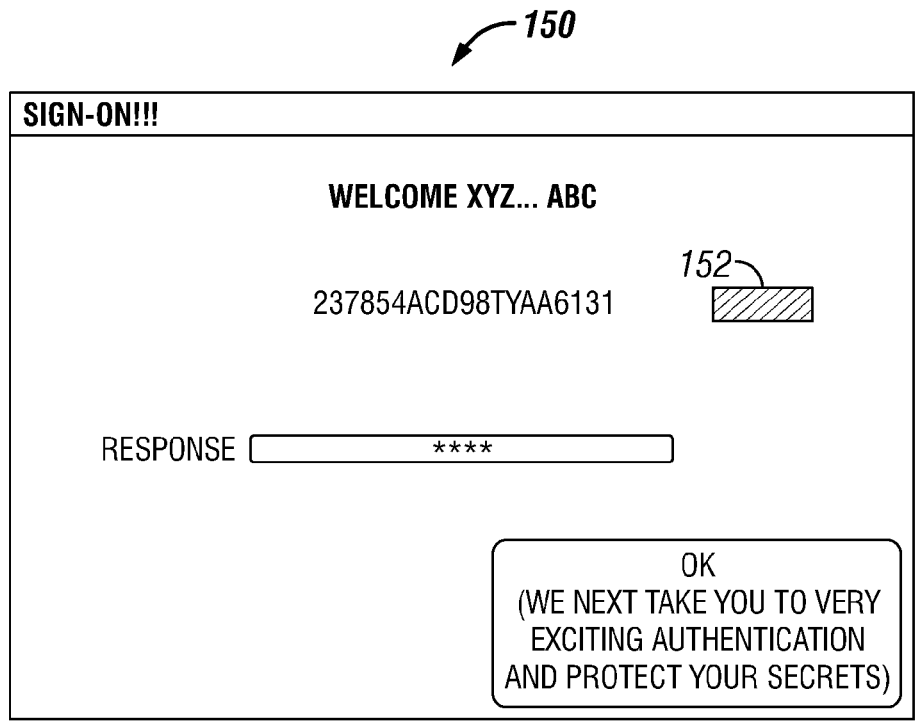
FIG. 8 is a screen shot illustrating the initial sign-on by the user.

FIG. 8 is a screen shot 150 illustrating the initial sign-on by the user 14. The user may reference a hint 152, which may provide a color code of a specific hint (e.g., yellow). In this case, the user keys in a response dependent upon the hint. For example, the user and authentication system 10 may have agreed that the response shall be "key-in first letter, then key-in the incremented alpha-digit (modulo, e.g., 9 incr becomes 0, Z increment becomes A) at fourth position of the original parameter (237 . . . 6131 as shown) and finally key-in the last two letters." In this example, the correct response would be "2931." In the above example, the increments and decrements of the numerals correspond to "confusion".

Theoretically, there are infinitely many such possibilities on the combination of hints and pre-agreed computations and, as such, the theoretical probability of some unauthorized personnel guessing a correct response practically approaches zero.

Each user 14 may have a few such hints (preferably 2 or 3) and computation functions. It should be understood by those skilled in the art that the present invention may encompass any conceivable function. However, in the preferred embodiment of the present invention, the user, for ease of use, most likely utilizes simple sequence arrangements and arithmetic operations. Hints are not restricted to simple figures, numbers or graphics but may encompass all combinations of multimedia. For example, a use may decide that multi-media presentation such as a song that is non-obvious and does not reveal the (computational function) be played during the challenge-response phase serving as a hint. This may assist the user to recollect the way a challenge has to be responded to. The present invention allows the user to utilize their specific preferences and tastes. The challenge-response (and the associated hints, functions and profile data) is then fine-tuned to the user during the profiling phase by the expert system 80 (i.e., the brain behind the profiler) and also drive the challenge engine afterwards. It should be noted that even if static data such as date-of-birth is used as a parameter in the challenge engine (and the response), since the associated (computation function is not known to others), the dynamic challenge-response is robust. Even if the identity and the birth profile were stolen, hackers still cannot practically guess the computing function and recognize the hints.

Figure 15:
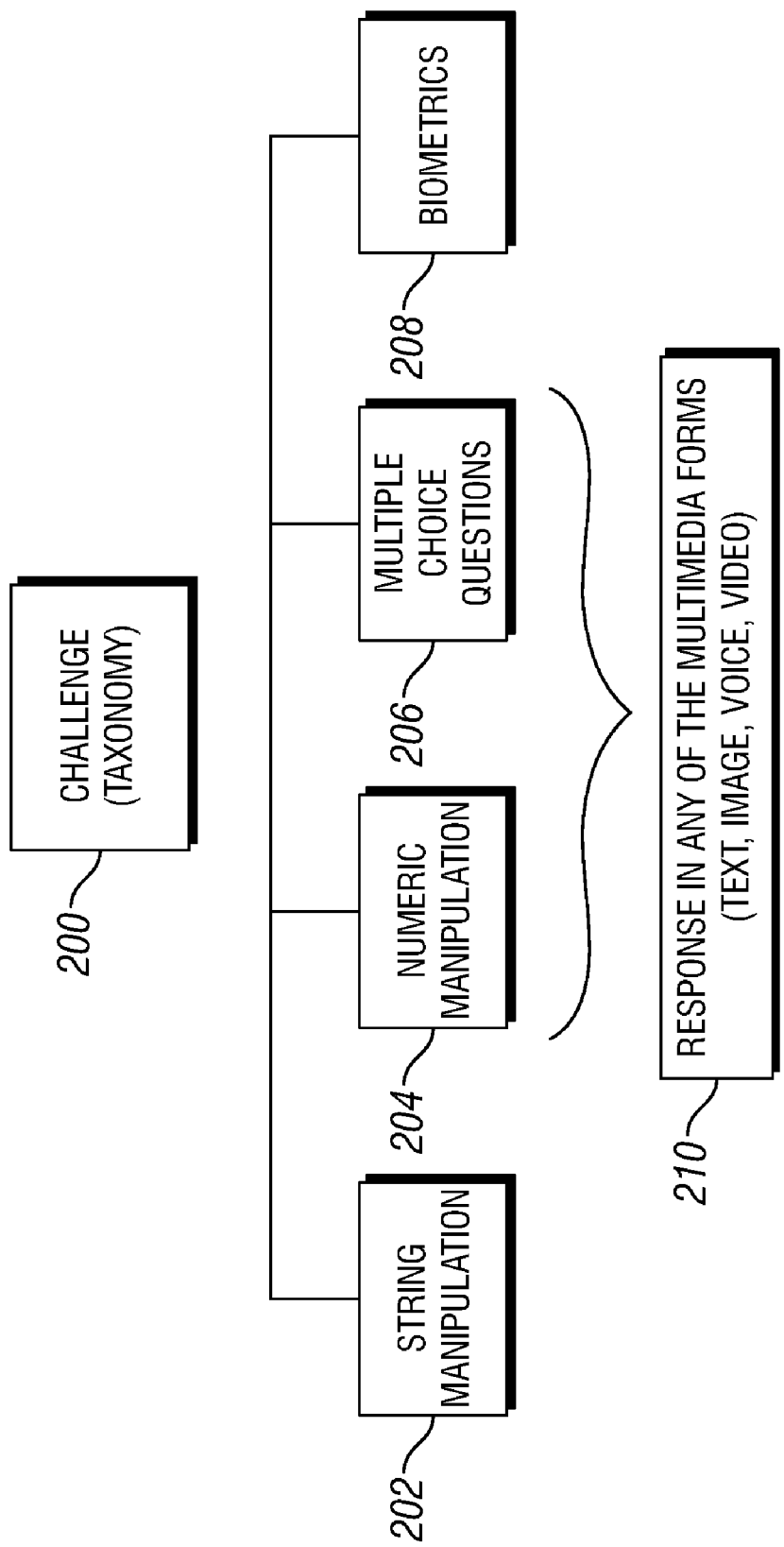
FIG. 15 is a block diagram of the components of the challenge and response scheme.

FIG. 15 is a block diagram of the components of the challenge and response scheme. A challenge 200 may include a string manipulation 202, a numeric manipulation 204, a multiple choice questions 206, and/or biometrics 208. A response 210 is then provided.

Another aspect of the present invention is that the operations may be nested (nested functions). It should be noted that during the profiling of the user, several demographical information may be collected so that appropriate hints and functions (computations) are chosen to suit the user's ability to compute (versus few hand-picking choices), age, and education of the user.

Figure 9:
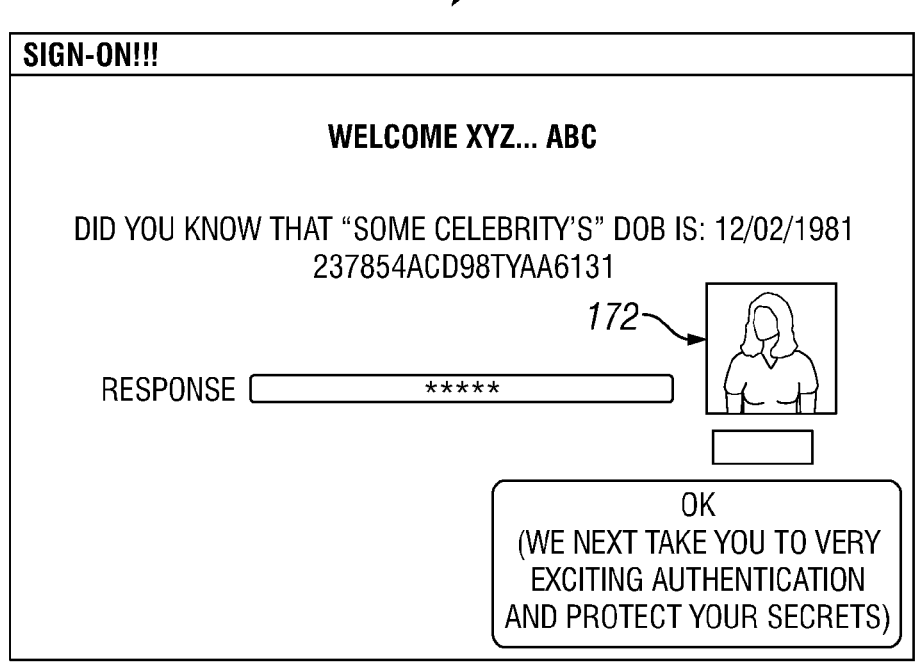
FIG. 9 is an exemplary screen shot having a hint.

FIG. 9 is an exemplary screen shot 170 having a hint 172. The user may be a fan of a celebrity. The function chosen by the user may be: "If DOB of a particular celebrity is thrown at, as a hint; the random string thrown as a challenge shall contain at least two or more consecutive digits as indicated in the DOB. The end-user shall then pick the letters adjacent to the "substring (of DOB digits)" pattern and flip them followed by that many digits from end-users social security number all flipped in reverse order." Suppose the last two digits of the user's social security number are 07. In this example, the correct response would be "TD70" to the above challenge, as 98 is the substring that matches in the random string below the hint. Flipping DT (adjacent to 98 in the random string) would provide TD, and since the last two digits of social security number are 07, flipping them also provides the final answer "TD70". Obviously, finding this response by an unauthorized user would be extremely difficult. In the above example, the letters 'T' and 'D' have been permuted (positions changed) in the response, thus implying a certain degree of "diffusion" in the response to the challenge.

The authentication system further provides a mechanism for the user to quicken the process of profiling at different organizations (such as different banks, etc.). The scheme fundamentally "fingerprints" the computational algorithms and the hints in the form of encoded data. The encoded profile data encodes the current user's profile through encryption and may rely upon an external coordinating database/system for the encryption keys (including published keys). This encoded string may be provided to a system at a different organization so that the user's profile can be replicated quickly. The user who is replicating the profile may be immediately challenged in order to ensure authenticity relating the user with the profile. This may be dependent on running the same kind of authentication system/profiler. The encoded profile may be unique and made universal for all the profilers. Furthermore, the encoded profile may have an expiration date and a one-time usage and verification policy after which it would no longer be valid and has to be regenerated at the originating system. A profiler-service may be run across several organizations so that the user need not go through several profiling exercises. It should be noted that the static data of the user profile does not have to be captured in the encoded string. This protects the user profile in the case where the encoded profile is lost or stolen by a hacker.

In one embodiment, the present invention may be utilized in messaging systems. In existing messaging systems, especially in those that involve human decision-making, the messages are typically classified into e-mail, instant-messaging, and voice/telephonic conversations. The message may be real-time or non-real time depending on response times. Texting or sending SMS (short message service) is the current state-of-art that is widely used today.

In all of these existing systems, there is little or no provisions for instant replay back, especially if the message is in the form of a query. Oftentimes, the user hits a reply button, and may quote the original text, and further type in the reply. This is not only time-consuming but also cumbersome on handheld devices involving tedious typing through key strokes. Furthermore, current messaging systems assume the safe delivery of the message by relying on end-device credentials and that the authorized user is handling the end-device. Thus, there is no mechanism to truly authenticate the message originating from a claimed source (user). In the case of email, even with PGP or S/MIME schemes, a one-time authentication via sign-on and/or the installed pair of public and private encryption keys (that are vulnerable to copying and theft) may not be sufficient as the devices may be acquired by unauthorized individuals. A signed on e-mail browse left unattended may create security breach towards unwanted access and delivery of messages to third parties. A dynamic on-demand authentication would be useful, especially in business transactions.

Another aspect is that apart from source (sender of the message) authentication (before the message is sent out), the same security vulnerability exists at the receiver side. There have been many instances where unwanted people have read secret/private e-mails of the recipients when their end devices (laptops, PDAs) are left unattended. It is imperative that the end reader (accessing notifications or e-mails or messages) should also be authenticated on demand, depending on the privacy rating and the confidence level needed to access/read and respond to such top, private messages. In this case, the delivery of the message should be accompanied by an appropriate level of authentication.

Also, in current use of response-oriented messaging is the application of web-based invitations which require responses from the invitees by providing the choice such as "Will attend Yes/No". Since, this application concerns invitations and responses to an event, the stakes are relatively low on a false/forged or delayed response and doesn't need strong authentication. However for business and other transactions, it is imperative to have a system that can provide strong authentication of the response, such as approval of a medical prescription, bank-check clearance and any work-flow decision approval, etc. None of the existing messaging systems currently address this security issue.

The present invention may be utilized in applications in fraud prevention for banking and financial institutions, validation of prescriptions for healthcare and several other applications requiring authentication.

The present invention may utilize context-sensitive query-response libraries that contain most frequently asked queries and their corresponding set of answers. Furthermore, the authentication system may be capable of learning newly formulated queries and possible answers of a formulated query. This presumes that the sender (who is sending the query) has a set of pre-configured responses from which the receiver may choose and reply back. In the case of a sender pushing a message, it can request for acknowledgement which constitutes a reply with "null" response with respect to query context.

In messaging systems, it would be cumbersome to prompt a user for text-based typing of passwords repeatedly to authenticate the user who shall be processing the received message. As a result, the current systems rely on one-time strong authentication of log-in with appropriate credentials. This one time log-in could also include a "one-time" challenge of any other queries pertaining to "pre-determined" multi-factors such as pet's name, birth city, etc. While this is useful for a better one-time log-in, it is rather static and provides ease to unauthorized access, until the timer expires (typically about 5 minutes). Moreover these challenges are easily broken by friends and acquaintances who can easily guess the pets name and so on.

A mechanism that is easy to interact by the users for dynamic and stronger authentication is required. The present invention combines the multi-level security and access to information and authentication in a non-intrusive manner in order to deliver to and get authenticated secure responses from recipients.

Figure 10:
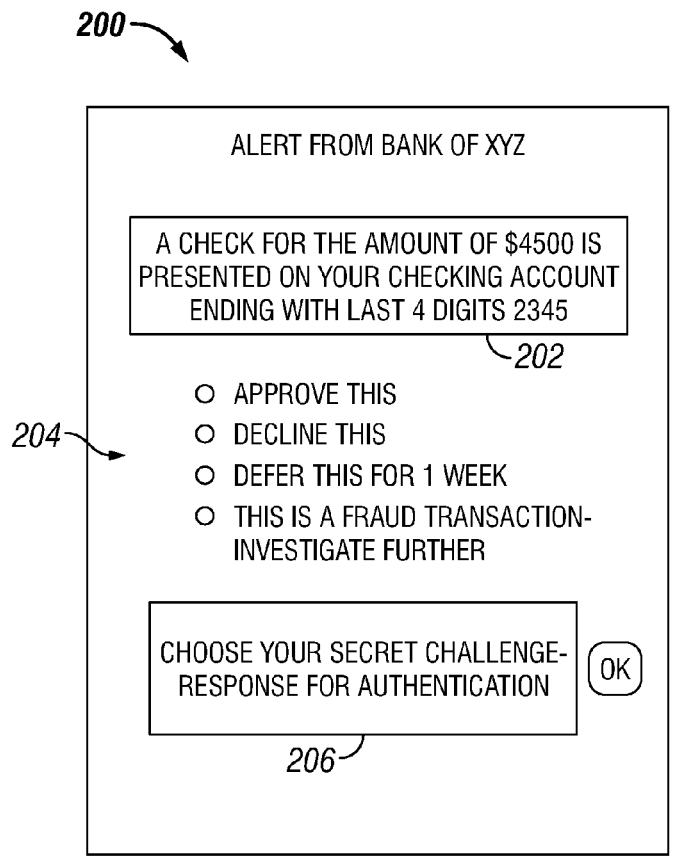
FIG. 10 illustrates an exemplary screen shot providing a fraud alert to the user.

In the context of financial institutions involving humans, the user 14 sets a threshold for a dynamic authentication and authorization of any financial transaction. For example, a party may be attempting to cash a check for more than $500. In this case, when a person (other than the account owner) tries to cash the check, an immediate alert in the form of a query-response may be sent to the actual account owners preferred device, such as a PDA, or cell phone with Internet access. FIG. 10 illustrates an exemplary screen shot 200 providing a fraud alert to the user. The screen shot 200 includes an alert message 202 and a plurality of responses 204. In addition, an authentication query 206 is provided. The notified party, upon receiving such a query response notification, may then choose the appropriate choice and also authenticate himself by entering a response on the challenge phrase. In the case where the notified party chooses the choice of "Fraud-Alert", the financial institution declines the transaction and further investigation may be made into the transaction. Without such dynamic authentication, it would not be possible to reliably decline/process the transaction on a real-time securely. In case the user desires to pre-authorize such as transaction, the user may send a message notifying the financial institution of the impending collection of the check (written to a third party, a legitimate transaction). This provides a parallel but dual confirmation/authorization on a check.

Figure 11:
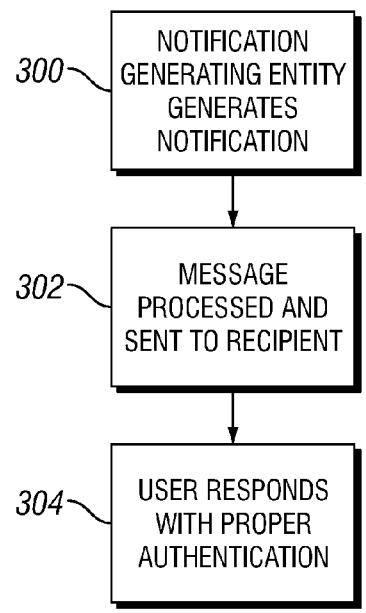
FIG. 11 is a flow chart illustrating the steps of authorizing a transaction to a financial institution.

FIG. 11 is a flow chart illustrating the steps of authorizing a transaction to a financial institution. The method begins in step 300 where a notification generating entity (can be authenticated and secured process or end-user/human) generates the notification with the desired authentication level of the recipient (who shall be responding to the message with appropriate authentication). Next, in step 302, a message server (not shown) processes the message and sends the notification to the recipient's communication device with an appropriate authentication challenge drawn from a profiled database of the authentication server. These challenges are never static and are rarely repeated. In step 304, the user 14 responds to the authentication, and if correctly authenticated, access to appropriate message response or resource is granted if the authorization approved. If the authentication fails, an appropriate error action is triggered. A similar application may be implemented for trapping identity thieves. If a fraudster applies for new credit on somebody's social security number, the legitimate owner (social security number) may be notified timely and get approval or provide a fraud alert instantly.

Figure 16:
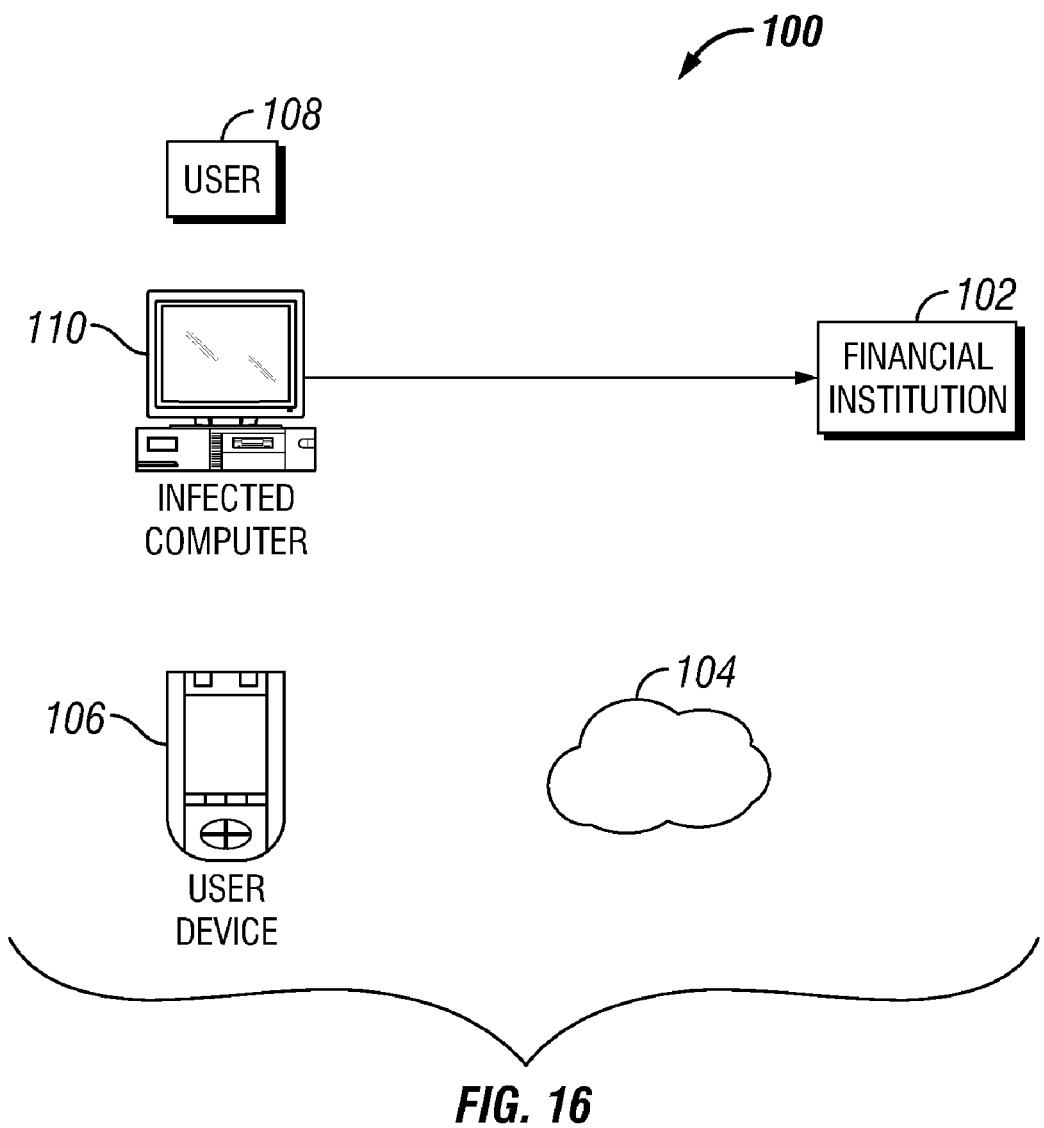
FIG. 16 is a simplified block diagram illustrating the components used in a financial system.

The utilization of a message may also act as a vehicle for second-factor authentication in order to mitigate the ill-effects of trojans. Trojans are pieces of software that run on the affected computers without the knowledge of the user. They work quietly in the background, collecting passwords, user-ids, etc. and eventually launch an illegal/unauthorized transaction usually involving banks and financial institutions. FIG. 16 is a simplified block diagram illustrating the components used in a financial system 100 illustrating the scenario where a computer is compromised by a trojan. A financial institution 102 communicates via the Internet 104, a user device 106 and the user 108 having an infected computer 110. The compromised computer is infected with trojans and moves money to a hacker's account. The financial institution, on detecting a transaction of a predetermined amount or type of transaction, sends a message to the user device 106 to inform the user of the transaction. The present invention provides a solution which is far superior to existing solutions as the transaction can now be doubly-authenticated, password collection by the trojans is rendered useless, and no further hardware or software tokens (one-time password generators) are needed. Furthermore, the notification for authorization that includes a customized challenge can be delivered to any of the user's chosen devices, such as a PDA, cell-phone, etc.

As a general utility, the message provides a vehicle of embedded authentication in the notifications that may have several applications where a human decision is needed. The applications include fine-tuning an access control list on the permissions granted to the users (a group using a resource) for the usage/access to any resource. For example, if a third party is requesting access to a document, the notification with challenge can be sent out to the original document owner over the network and get authorized to access the document. Note that it would simply modify the access list over the notification in contrast to revoking passwords from the users (in the access control list). The application may also be extended to a federated authentication system for enterprises, households, and all computing systems that a "single" user needs to access in contrast to single sign-on.

Figure 12:
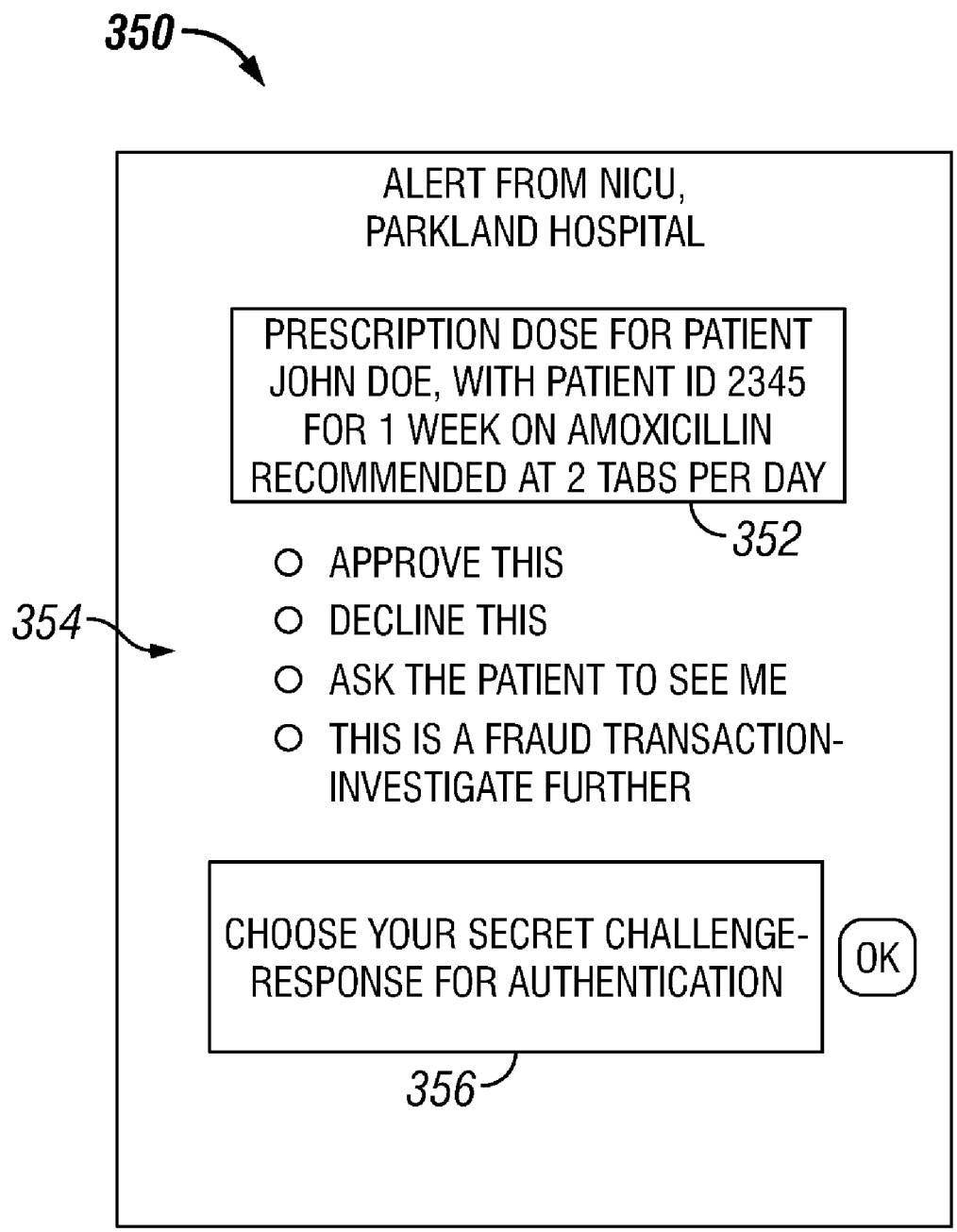
FIG. 12 illustrates a screen shot illustrating an alert message, a plurality of responses and an authentication query.

The present invention may also be utilized in the health industry. For example, whenever a pharmacist or a nurse requires an authorization for a medical prescription/dosage by the practicing doctor, a query may be utilized. FIG. 12 illustrates a screen shot 350 illustrating an alert message 352, a plurality of responses 354 and an authentication query 356. The present invention may provide authenticated notification messages for any type of industry. There exist certain automated processes which generate queries that require human responses in order to proceed further with the execution. Business process execution (BPE) and Customer relationship management (CRM) require such interactions and, in order to provide secure authenticated responses, the secure authenticated notification and response may be applied.

Figure 13:
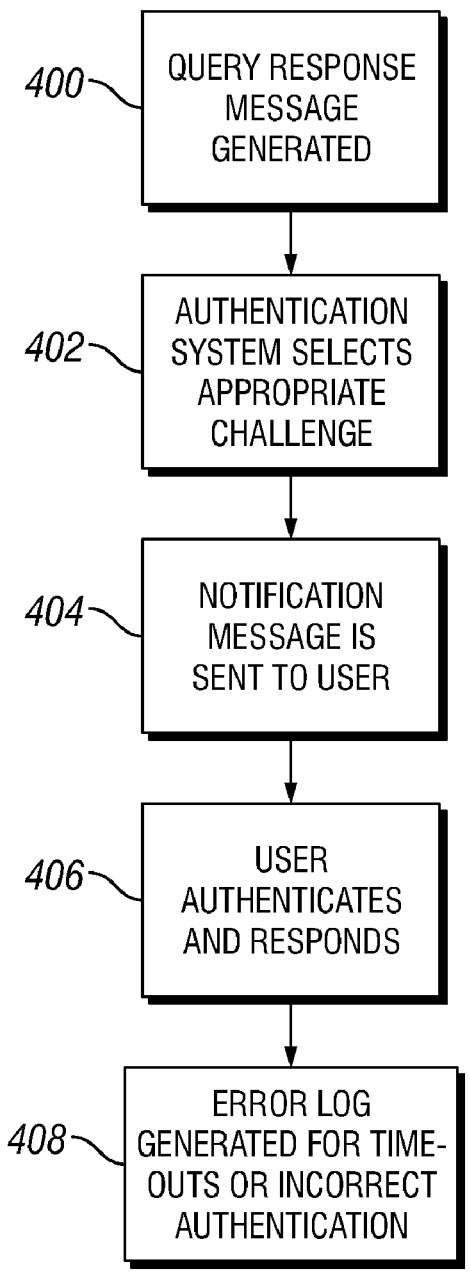
FIG. 13 is a flow chart illustrating the steps of notifying and authenticating a user.

FIG. 13 is a flow chart illustrating the steps of notifying and authenticating a user. In step 400, a query response message is generated with a desired level of authentication at the receiver end. Next, in step 402, the authentication system selects an appropriate challenge at the desired level of authentication at the receiver. This implies that the challenges are multi-level rated so that different applications can invoke appropriate level of authentication. In step 404, a notification message is sent at the appropriate receiving end (user 14). Next, in step 406, the user 14 authenticates and responds to the message. The authentication system may wait for a timeout to occur if an authenticated response is received. In step 408, if authentication fails, or timeout occurs, an appropriate error log is generated and access to the appropriate resources or data is denied. These applications belong to a class called "Post-display (or post-access to resources) authentication services". In this case, the message is viewed first, without any authentication. However, when responding, the responding user needs to correctly answer the authentication challenges.

In another class of application, the present invention may be utilized in "Pre-display authentication services" or pre-access to resources. These invoke an authentication process prior to displaying the message (or document access). For example, in order to retrieve top secret e-mail, when the user clicks on the e-mail URL, the authentication process is invoked in a pop-up window and after properly authenticating the user, the message is displayed.

Figure 14:
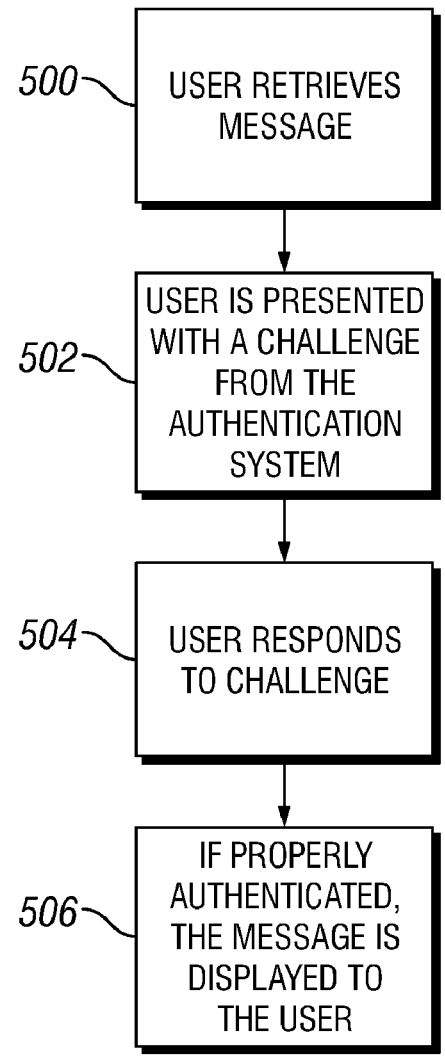
FIG. 14 is a flow chart illustrating the steps for authentication prior to display of the message.

FIG. 14 is a flow chart illustrating the steps for authentication prior to display of the message. In step 500, the user selects or retrieves the secure email (or message). Next, in step 502, the user is provided with a challenge-response query requiring response to a challenge. The challenge and response is dynamically based, as discussed above. Next, in step 504, the user responds to the challenge. Next, in step 506, the message is displayed to the user (after decryption). With current "one password" to log-in of email systems, an enhanced authentication system with dynamic challenge-responses is needed. This is done typically by providing a profiler of the user which can capture the essence of identification, habits and other elements typical to the user. This mechanism provides multi-tier authentication levels. In the above example, the security (authentication) may not be invoked for all emails, but may be applied to specified emails. This is preferably designated by the sender of the email. Typically, encryption techniques are applied to the email during transmission and retrieval based on either symmetric or asymmetric encryption schemes such as AES/DES, RSA, etc.

In addition, there is another class of services that require both "Pre-display" (pre-access to resources) and "Post-display" (post-access to resources) authentication services. For example, if a secret message needs to be read and responded to, then it may need authentication prior to the user reading the message and after the message is read and responded to.

The query response messages may be generated automatically by computer or by humans. If the queries are generated by computer, the authenticating system may provide a capability to generate queries based on the preferences and identification of the user. The authentication system may utilize templates to assist in generating the appropriate queries for the specified user. The templates may reduce the effort needed by a user in responding to query preferences.

The present invention may be implemented as applications which are utilized in a wide variety of industries, such as medical records access, defense/government and key security data access by only authorized personnel, and labs with sensitive data etc. The present invention may be implemented in an Internet-version where it relies upon the existing art on security mechanisms such as IPSec, TLS and the start-of-art encryption algorithms to move chunks from source to destination over the Internet. A chunk is defined as any piece of data, code, media etc. in encrypted, encapsulated or even in plain mode over a VPN that will eventually be put to use at the client (user) in some form. The second version does not rely on Internet transport, but logically on any device where the elements of the scheme can be implemented without using Internet transport. The scheme is applicable to any device such as, but not limited to, PDAs, handhelds, laptops, computers, phones workstations, and any electronic device. In addition, the present may be utilized on a multi-granularity and per-resource basis. Thus, the present invention may provide different levels of authentication based on the specific resource accessed or specific information or service requested.

The present invention provides many advantages over existing authentication systems. The present invention proactively prompts the user for simple inputs. Network traffic is reduced as the challenges and answers are provided in encrypted form that the user inputs can be locally verified at the client side. In one embodiment, client code destroys itself if tampered and sends a notification to server/administrator indicating the violation of the security. Dynamic thresholds depending on the degree of data security may be implemented. The profiles may be securely transferred through a mediation agency as required. If multiple choices are used, the users do not have to key-in any data via keyboard (logical or physical).

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An authentication system for authenticating a user in a network, the authentication system comprising:
   a secure computer resource;
   a computer providing dynamic authentication of a user accessing the computer resource; and
   a user communication device for communicating between the user and the computer resource;
   wherein the computer includes a challenge engine for generating a non-static challenge containing randomly generated data to the user;
   wherein the computer stores a pre-determined function known by the user, the pre-determined function being utilized by the user to perform a manipulation of the data within the challenge to formulate a correct response to the computer;
   wherein the pre-determined function is established between the user and the computer resource prior to a first authentication session, the pre-determined function remaining constant over a plurality of attempted access sessions;
   wherein the computer includes means for receiving the response from the user and determining if the response properly manipulates the challenge based on the pre-determined function;
   whereby access is granted by the user to the secure computer resource upon receiving a correct response determined by the computer to properly manipulate the data within the challenge based on the pre-determined function.

2. The authentication computing system of claim 1 further comprising an expert system adaptable to capabilities of the user to provide responses based on the pre-determined function and providing training to the user for properly manipulating data within the challenge to formulate a correct response based on the pre-determined function.

3. The authentication computing system of claim 1 wherein the authentication computing system provides a honey pot mode, wherein an unauthorized user is presented with false challenges to lure the unauthorized user.

4. The authentication system of claim 1 wherein the authentication computing system includes a profiler, the profiler having means for determining facts and preferences of the user.

5. The authentication system of claim 4 wherein the profiler includes a profile bank storing challenges, hints and functions, the profiler utilizing the profile bank to generate challenges and present hints to the user.

6. The authentication system of claim 4 wherein the profiler conducts a re-profiling of the user after a specified time period.

7. The authentication system of claim 1 wherein the authentication computing system includes a means for alerting the user of an unauthorized attempt at accessing the computer resource.

8. The authentication system of claim 1 wherein the authentication system is utilized in messaging between a first user and a second user.

9. The authentication system of claim 1 wherein the authentication system is utilized in financial transactions, wherein the user communication device is alerted to a financial transaction, the communication device being presented with a challenge prior to authorizing the transaction.

10. The authentication system of claim 1 wherein the authentication system is utilized for medical transactions, wherein the user communication device is alerted to a medical transaction, the communication device being presented with a challenge prior to authorizing the transaction.

11. The authentication system of claim 1 wherein the authentication computing system utilizes a plurality of pre-determined functions, each function being associated with a predetermined hint known to the user, the hint providing an indicator of the current function to use when responding to a presented challenge.

12. The authentication system of claim 11 wherein the authentication computing system provides two types of challenges, a first type of challenge being a master question for use for higher level security and a cruise question for a lesser level security.

13. The authentication system of claim 11 wherein the authentication computing system employs a tier-based presentation of challenges, a first tier based on a higher level of security and a second tier based on a lesser level of security.

14. The authentication system of claim 13 wherein the tiers are determined by the user for a specified event or situation.

15. The authentication system of claim 11 wherein a correct response is dependent upon time of the challenge.

16. The authentication computing system of claim 1 wherein the user is provided with a one time use internet hyperlink for use in authentication by the authenticating computing system.

17. The authentication computing system of claim 1 wherein the authentication computing system creates a profile of the user, the profile being transferable to other entities for authentication of other computer resources.

18. The authentication computing system of claim 1 wherein the authentication computing system provides second factor authentication and message notification to the user when access is attempted to the computer resource.

19. The authentication computing system of claim 1 wherein the authentication computing system is located within a standalone computer separate from the computer resource.

20. A method of authentication a user in a network, the method comprising the steps of:

securing data in a computer resource;
dynamically authenticating a user accessing the computer resource by a computer, wherein the step of dynamically authenticating a user includes the steps of:
storing, in the computer, a pre-determined function known by the user, the pre-determined function being utilized by the user to perform a manipulation of data within the challenge to formulate a correct response to the computer;
wherein the pre-determined function is established between the user and the computer resource prior to a first authentication session, the pre-determined function remaining constant over a plurality of attempted access sessions;
generating and presenting a non-static challenge having randomly generated data, by a challenge engine within the computer, to the user;
receiving a response by the user; and
determining, by the computer, if the response is correct by determining if the response properly manipulates the data within the challenge based on the pre-determined function;
upon determining, by the computer, that a correctly response is received by the user, granting access by the user to the computer resource.

21. The method of authenticating a user of claim 20, wherein the step of dynamically authenticating a user includes storing by the computer a plurality of functions, each function being associated with a predetermined hint known to the user, the hint providing an indicator of the current pre-determined function to use when responding to a presented challenge.

22. The method of authenticating a user of claim 20 the step of dynamically authenticating a user includes employing a tier-based presentation of challenges, a first tier based on a higher level of security and a second tier based on a lesser level of security.

23. The authentication computing system of claim 1 wherein the response dynamically changes based on receiving a different challenge.

24. The authentication computing system of claim 1 wherein:
the response is unique and non-reusable based on data presented in the challenge, thereby resulting in a dynamic response; and
the response is based on manipulating embedded data in the challenge.

25. The method of authenticating a user of claim 20 wherein:
the step of determining, by the computer, if the response is correct includes determining if the response properly manipulates data embedded in the challenge.

26. The authentication computing system of claim 1 wherein:
the pre-determined function is a mathematical function;
the data includes a random string of characters in the challenge; and
the characters within the challenge are manipulated to create a response.

* * * * *